Aug. 2, 1938.  W. H. FOSTER  2,125,493
LIFTING JACK
Filed June 22, 1936
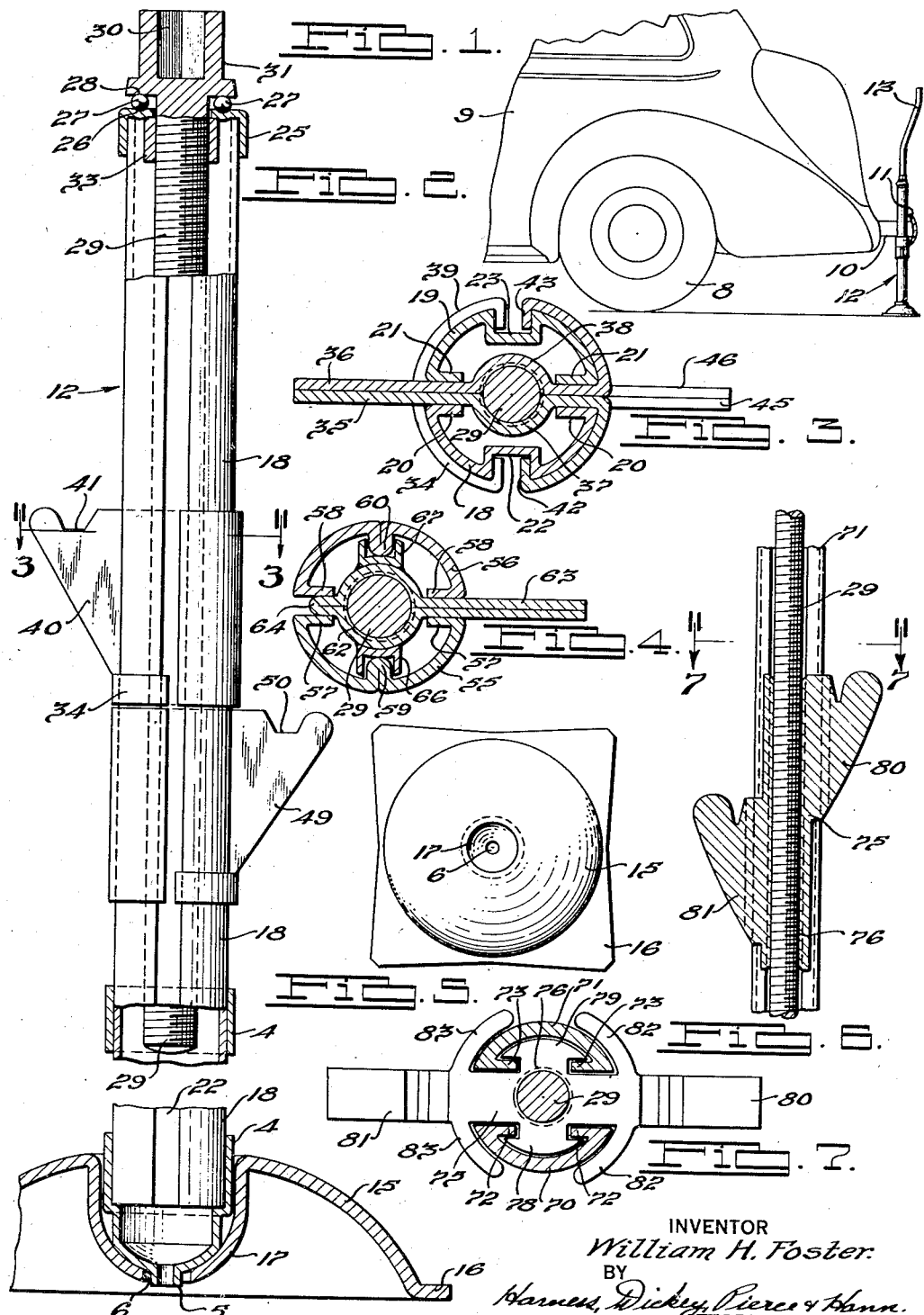
INVENTOR
William H. Foster.
BY
Harness, Dickey, Pierce & Hann.
ATTORNEYS.

Patented Aug. 2, 1938

2,125,493

UNITED STATES PATENT OFFICE 2,125,493

LIFTING JACK

William H. Foster, Elkhart, Ind., assignor to Walco, Incorporated, Detroit, Mich., a corporation of Michigan Application June 22, 1936, Serial No. 86,449

4 Claims. (Cl. 254—100)

This invention relates to jacks. More particularly it relates to a particular type of jack primarily adapted for raising portions of an automotive vehicle in order to effect changes of tires or wheels.

Heretofore it has been conventional to provide vehicle jacks which were constructed to engage underneath the axle to which the wheel is attached and jacks of this type have long been in common use. In recent years the body structures of vehicles have been modified to such an extent that it is exceedingly difficult to properly position a jack underneath the axle of a vehicle, particularly the rear axle thereof, and further is extremely difficult and inconvenient to operate the jack while so positioned. As a result of this several attempts have been made to provide satisfactory jacks which are adapted to engage the bumper or bumper support bars and lift the body of the vehicle a substantial extent whereby despite flexure of the springs serving to support the wheel, the wheel will be elevated sufficiently far to effect the tire or wheel changes necessary.

It is a primary object of the present invention to construct a jack adapted to engage a portion of the vehicle body and lift the body sufficiently far so that despite expansion of the spring serving to support one of the vehicle wheels the wheel will be raised from the ground.

It is a still further object of the present invention to provide a jack of this generic type which may be simply and conveniently constructed substantially entirely from sheet metal parts and which may be operated by means of a wrench or crank similar in construction to the wrench adapted to engage the nuts used for demountably supporting the vehicle wheels.

The present invention contemplates the provision of a jack construction in which a pair of complementary sheet metal columns are supported in a unitary base member, which columns jointly serve to support at their upper ends a cap member which interconnects the columns to provide a unitary structure. This cap member is preformed to provide means for rotatably mounting a downwardly extending exteriorly threaded shaft which serves to support a lifting lug adapted to engage the bumper or bumper support bar of a vehicle. The lifting lug is preformed in a novel manner in order that it will engage adjacent portions of the columns and maintain the lifting shaft accurately positioned therebetween to guide the lifting lugs during vertical movement and insure relatively friction free operation of the apparatus as a whole.

It is a still further object of the present invention to provide a jack construction in which the portions of the lifting lug which engage the supporting columns engage these columns throughout a relatively large area in order that friction will be minimized and free axial movement of the lug with respect to the columns will be permitted.

Still further the present invention contemplates the provision of a construction in which the supporting columns are formed of sheet metal of novel rolled section, thus making possible an exceedingly cheap and easily fabricated jack construction which has the strength characteristics inherently necessary and desirable in apparatus of this general character.

Still further the present invention contemplates the provision of a jack construction in which novel interlocking means are provided between the lifting lug and the supporting columns permitting free axial movement of one with respect to the other and at the same time having all points of frictional engagement located interiorly of the columns in order that frictionally engaged parts may be conveniently lubricated without exposing the lubricated surfaces to the exterior of the apparatus.

Many other and further objects and advantages of the present invention will become clearly apparent from the following specification when considered in connection with the accompanying drawing forming a part thereof.

In the drawing:

Figure 1 is a fragmentary side elevational view of the rear portion of a vehicle body illustrating one embodiment of the improved jack in position for elevating the same.

Fig. 2 is an enlarged side elevational view with parts in section and parts broken away showing a vehicle jack embodying the improvements of the present invention.

Fig. 3 is a transverse sectional view taken substantially on the line 3—3 of Fig. 2 illustrating the manner in which the lifting lug is interlocked with the supporting columns for free axial movement there along.

Fig. 4 is a transverse sectional view similar to Fig. 3 illustrating a modified form of jack construction utilizing a different type of lifting lug and having supporting columns of different cross-sectional configuration.

Fig. 5 is a plan view of the supporting base of the jack shown in Fig. 2 illustrating the construction thereof.

Fig. 6 is a fragmentary vertical sectional view of a still further modified form of the invention illustrating a modified form of lifting lug construction and utilizing modified support columns.

Fig. 7 is a transverse sectional view taken substantially on the line 7—7 of Fig. 6 illustrating in detail the lifting lug and columns of the modified form of the invention shown therein.

With more particular reference to the drawing, it will be fully appreciated that while the specific illustrations shown therein disclose a jack construction primarily intended for automotive vehicle use, that the broad inventive concept presented in this application is much more substantial in scope and that certain features of the improved jack mechanism disclosed in this application will find broad and practical utility in many constructions outside of the automotive field.

In Fig. 1 the rear portion of a vehicle is seen. This vehicle may be of conventional construction having rear wheels 8 which serve to support the body 9 of the vehicle on the surface over which the vehicle is adapted to travel. Extending rearwardly from the vehicle are a pair of bumper support bars 10 which serve to support a rear bumper member 11 which is of substantially conventional construction. A jack generally designated as 12 is adapted to engage either the bumper support bar 10 or the bumper 11 to elevate the vehicle body sufficiently so that the rear wheel 8 may be raised clear of the ground. The jack 12 is adapted to be actuated by means of a crank or wrench 13 engaging the upper end thereof as will hereinafter be more clearly understood.

While it will be readily appreciated from the following specification that the specific embodiments of the jack illustrated herein are merely illustrative, the modifications shown will be described in detail and it will be understood that substantial modifications of the specific construction shown may be made at the same time falling within the scope of the present invention. The jack 12 includes a base 15 which may be formed from a single integral sheet metal stamping. This base may be generally rectangular in configuration and be provided with a plurality of projecting ears 16 all lying in a common plane, which ears serve to afford a substantial area of surface contact with the ground on which the jack is disposed thereby distributing the weight of the vehicle lifted by the jack over a relatively large area. The central portion of this base member 15 is crowned upwardly and provided in its central portion with a hemispherical depression 17 which serves to provide means for mounting the lower ends of a pair of support columns 18 and 19 respectively.

The columns 18 and 19 may likewise be formed of sheet metal and preferably are of substantially identical cross-sectional configuration and are generally semi-cylindrical in shape. To facilitate storage of the jack when not in use it is desirable that the support columns be mounted removably with respect to the base member. Due to the fact that when a vehicle is lifted by means of a jack of this type it is necessary for the jack to move throughout a relatively large vertical range consequently some substantial variation in the inclination of the jack from the vertical must take place. Consequently it is not only desirable to provide a removable mounting for the columns with respect to the base but also to provide for some limited pivotal movement thereof. In order to accomplish this end, the lower ends of the columns 18 and 19 are preferably welded into a cylindrical cuplike member 4, the lower portion of which is performed to provide a hemispherical surface adapted to seat within the hemispherical depression 17 in the base member. The fit of the cuplike member 4 within this depression is relatively loose in order that pivotal movement of the columns may take place with respect to the base member. If desired the cuplike member 4 may be provided with a projecting pilot 5 which is adapted to enter a suitable aperture 6 in the bottom of the hemispherical depression 17 in order that when the parts are assembled the cuplike member 4 will be properly seated in place. The lateral marginal edges of the column 18 may be bent inwardly to provide flanges 20 which lie in a common plane and serve to provide a structure of substantially increased strength. Likewise the lateral marginal edges of the column 19 may be bent to provide inwardly extending flanges 21 lying substantially parallel and in spaced relation to the flanges 20 on the column 18. The columns 18 and 19 are provided in their outer central portions with a depression providing channels 22 and 23 respectively, which channels, as will hereinafter be more clearly seen, not only serve to increase the strength of the columns and resist their tendency to collapse, but also serve to provide means for guiding the lifting lugs hereinafter described in detail. The columns are interconnected at their upper ends by means of a cap member 25 which is of generally circular configuration and is adapted to telescope over the upper ends of the columns 18 and 19 and is preferably welded thereto. This cap member 25 is provided in its upper surface with an annularly extending groove 26 which forms a raceway for a plurality of ball bearings 27 which serve to engage a complementary raceway 28 on the shoulder of a downwardly extending externally threaded shaft 29. This shaft 29 is provided at its upper end with a polygonal recess 30 adapted to receive a polygonal socket wrench and the external surface 31 of the upper portion of this shaft may likewise be formed polygonal in order that a hollow socket wrench may be utilized for the purpose of effecting rotation of the shaft.

From the foregoing it will be appreciated that the shaft 29 extends downwardly between the spaced columns 18 and 19 and that the adjacent flanges 20 and 21 of the columns serve to define axially extending diametrically opposite slots on either side of the supporting structure. Further, it will be appreciated that the supporting columns 18 and 19 being generally semi-cylindrical in configuration serve to enclose a hollow interior in which shaft 29 is disposed, communication with this hollow interior being had through the axially extending slots on opposite sides of the supporting structure. Further, it will be understood that the ball bearings 27 serve to provide a relatively friction free mounting for the shaft in order that it will be freely rotatable within the supporting structure. A collar 33 is preferably threaded on the shaft and engages the underneath surface of the cap member 25 in order to maintain the ball bearings 27 in their raceways and maintain the apparatus as a whole in assembled relation.

While a suitable bearing or bushing may be provided at the lower end of the shaft 29 in order that its position with respect to the supporting columns will be properly maintained, it has been found that the guiding lugs, hereinafter described in detail, in most instances serve to position this shaft accurately with respect to the columns with which it is associated.

While a single lifting lug may be associated with the shaft it has been found desirable in some instances to provide a construction in which a pair of lifting lugs are disposed one above the other on the shaft 29 and simultaneously actuated by rotation thereof. The upper of these lifting lugs is clearly seen in the sectional view, Fig. 3, and may include a pair of mating sheet metal members 35 and 36 which are preformed in their central portions to provide semi-cylindrical recesses 37 and 38 therein, which recesses mate when said members are secured together face to face to provide a cylindrical bore of a diameter adapted to receive the shaft 29. The members 35 and 36 are welded or otherwise suitably secured together face to face and the internal bore formed by the semi-cylindrical depressions 37 and 38 is internally threaded on to the shaft 29. It will be seen that the members 35 and 36 project outwardly through the slot between the flanges 21 and 20 on the columns 19 and 18 and are formed to together provide a lifting lug generally designated as 40. These members may be recessed in their upper marginal edges to provide a notch 41 adapted to engage the bumper bar or other portion of the vehicle to effect lifting thereof.

The portions of the members 35 and 36 on the opposite side of the semi-cyclindrical depressions 37 and 38 extend outwardly through the slot at the opposite side of the columns and are bent to a configuration adapted to mate closely with the exterior configuration of the columns 18 and 19. The extreme marginal edges of the members 35 and 36 are bent to provide inwardly projecting flanges 42 and 43 which are adapted to enter the channel-ways 22 and 23 in order to interlock the members with each of the columns 18 and 19. Narrow strips 34 and 39 formed integrally with the members 35 and 36 respectively at the lower marginal edges thereof may project through the slot through which the lifting lug 40 projects. These members are bent around to lie closely adjacent the exterior surfaces of the columns 18 and 19 and have the extreme ends bent in to lie closely adjacent to one wall of the channels 22 and 23 thus providing an interlock similar to but oppositely disposed with respect to that provided by the flanges 42 and 43. It will be appreciated that this construction provides one in which the lifting lug structure as a whole is locked against transverse movement with respect to the columns 18 and 19 but is freely slidable axially thereof as the shaft 29 is rotated. It will further be appreciated that the bearing engagement of the members 35 and 36 with the columns is upon the exterior surface thereof and that lateral thrust caused by a pressure upon the notch 41 of the lifting lug 40 is transmitted to the columns by means of the flanges 42 and 43 which engage the side walls of the channel-ways 22 and 23.

The lower lug may be substantially identical in construction including a pair of sheet metal sections 45 and 46 which are oppositely disposed from the sections 35 and 36. The rear portions of the members 45 and 46 extend through the slot between the columns 18 and 19 and are bent around to enter the channels 22 and 23 in much the same manner as the flanges 42 and 43 described above. The members 45 and 46 are likewise preformed in their central portions to together provide a cylindrical interior threaded bore adapted to be engaged by the shaft 29 and these members project out through the slot on the opposite side of the columns to form a lifting lug generally designated as 49 which may be provided with a notch 50 adapted to engage a portion of the vehicle body to be elevated.

Inasmuch as the members 40 and 49 are entirely independent of each other they may be spaced upon the shaft 29 any suitable axial distance which may be convenient. It will be appreciated that when a wrench engages the polygonal head 31 on the polygonal socket 30 in the upper end of the shaft 29 the shaft may be freely rotated effecting an axial movement of the lifting lugs 40 and 49 with respect to the support columns. Further, it will be understood with the construction and arrangement of the parts described above that during a normal lifting operation the columns 18 and 19 are subjected to substantial forces of compression and as has been explained these columns are of a cross-sectional configuration particularly adapted to resist such forces. Further the shaft 29 is due to its mounting at its upper end subjected to tensional forces which it is particularly adapted to resist. This tensional force applied to the shaft 29 is transmitted to the columns through the ball bearing members 27, thus making for a relatively friction free mounting and easy rotation of the shaft irrespective of the magnitude of the forces imposed thereon. From the foregoing it will be appreciated that the above described construction is relatively cheaply and easily fabricated from sheet metal parts and provides a construction which is exceedingly rugged, strong and friction free in operation.

In the modified construction illustrated in Fig. 4 of the drawing it is seen that a pair of columns 55 and 56 are provided which have a cross-sectional configuration somewhat different from the columns 18 and 19 described above. These columns are each provided with inwardly projecting flanges which serve to define axially extending slots through which the lifting lugs may extend. These column members 55 and 56 may be provided with flanges 57 and 58, respectively, similar in construction to the flanges 20 and 21. The central portions of the columns are deformed to provide axially extending inwardly projecting beads 59 and 60, the purpose and function of which will hereinafter be more clearly seen. The lifting lug utilized in connection with this form of the invention is of substantially modified construction. As seen in Fig. 4 a single integral sheet of metal is bent upon itself to provide a cylindrical aperture 62 between the adjacent portions thereof which aperture may be interiorly threaded and adapted to receive the operating shaft 29. Mating portions of the lug extend outwardly through one of the slots defined by the flanges 57 and 58 to provide a lifting lug 63 substantially similar in construction to the lifting lugs 40 and 49 described above. The folded portion 64 of the sheet from which the lug is formed extends between the flanges 57 and 58 on the opposite sides of the columns and serves to aid in accurately positioning the lug structure as a whole between the columns and maintaining the operating shaft 29 centrally disposed with respect thereto. A pair of sheet metal channels 66 and 67 may be welded to the exterior surface of the cylindrical portion 62 of the lug structure which channels are adapted to engage the inwardly projecting beads 59 and 60 in order to position the lug structure within the hollow column structure.

It will be appreciated that in this form of the invention substantially all bearing surfaces between the movable lug and the columns are located interiorly of the columns whereby the frictionally engaged surfaces may be conveniently lubricated without exposing the lubricant to the exterior of the apparatus, thus providing a product which may be easily and conveniently handled. It will be appreciated that this form of the invention retains the inherent advantages found in the preferred embodiment of the invention described above in that interengaging means are provided between the lug structure and the columns for preventing relative transverse movement of these parts and at the same time permitting relatively friction free axial movement of the lug with respect to the columns. Further this form of the invention is likewise easily and simply constructed from sheet metal parts and may be cheaply and simply fabricated.

In the still further modified form of the invention illustrated in Figs. 6 and 7 it is seen that a pair of columns 70 and 71 are provided which are of extremely simple rolled section having inwardly directed flanges 72 and 73, respectively, which flanges serve to define vertically extending slots between the columns. The lug structure utilized in this form of the invention is preferably a casting or a forging generally designated as 75. This casting has a central aperture 76 which is interiorly threaded and adapted to receive the vertically extending operating shaft 29. The casting is preformed to provide a pair of projecting portions 78 and 79 which are complementary to the interior of the columns 70 and 71, respectively, and provide a bearing surface throughout substantially the entire interior surface of the columns. Upper and lower lifting lugs 80 and 81, respectively, are formed integrally with this casting 75 and extend outwardly through the slots between the columns on diametrically opposite sides. The lifting lugs 80 and 81 are provided with wing portions 82 and 83, respectively, which are adapted to closely and slidably engage the adjacent exterior surface of the columns, thus providing a lifting lug construction in which a bearing surface is obtained not only upon the interior surface of the columns, but also on the exterior surface thereof.

This construction embodies certain of the advantages of both of the modified forms of the invention described above and provides a lifting lug structure having a relatively large surface area of contact with the columns thus making possible relatively friction free movement of the lug structure with respect thereto.

The head and base structure of the two last described modified forms of the invention may be of any suitable construction and arrangement such for example as that illustrated in connection with the preferred embodiment shown in Figs. 1 to 3, inclusive.

It will be appreciated that the above described modifications are merely illustrative of the generic inventive concept presented herein. Many other and further modifications thereof falling within the scope of the invention as defined in the sub-joined claims will be apparent to those skilled in the art.

What I claim is:

1. A jack including a base member, a pair of sheet metal columns of rolled section permanently mounted on said base member, a cap member serving to interconnect said columns at their upper ends to position the same in spaced relation with respect to each other, means on said cap member for rotatably supporting a lifting shaft between said columns, a lifting lug on said shaft adapted for vertical movement by rotation of said shaft, said lifting lug having portions adapted to slidably engage the exterior surface of said columns to preclude relative transverse movement of said lug with respect to said columns, said columns having grooves in their exterior surface, and means on said lug adapted to enter said grooves and position said lug with respect to said columns.

2. A vehicle jack including, in combination, a pair of spaced vertically extending sheet metal columns preformed to provide axially extending outwardly presented channels in their exterior surfaces, an exteriorly threaded lifting shaft extending downwardly between said columns, a lifting lug threadably mounted on said shaft having a portion extending outwardly between said columns, said portion being adapted to engage the exterior surface of one of said columns, and having a flange adapted to enter said outwardly presented channel to position said lug and shaft with respect to said columns.

3. A lifting jack including in combination a pair of sheet metal columns secured together in spaced relation and serving to support a rotatable threaded lifting shaft therebetween, a lifting lug threaded on said lifting shaft and disposed between said columns, said columns each being preformed to provide an axially extending outwardly presenting channel in the exterior surface thereof, said lifting lug having portions thereof adapted to lie closely adjacent the exterior surface of said columns and a flange on said last mentioned portion adapted to enter said channel to guide said lifting lug during vertical movement.

4. A lifting jack including in combination a pair of generally semi-cylindrical sheet metal columns mounted in spaced parallel relation, a threadable lifting shaft disposed between said columns threadably received on said lifting shaft, said lifting lug being formed of a pair of sheet metal members, portions of said sheet metal members extending outwardly through the space between said columns to provide a lug for engaging the work to be lifted, said columns having axially extending outwardly presented channels therein and other portions of said members extending outwardly through the space between said columns over the surface of said columns and entering said channels to guide said lug for vertical movement with respect to said columns.

WILLIAM H. FOSTER.